(12) United States Patent
Donahue

(10) Patent No.: US 9,980,874 B2
(45) Date of Patent: May 29, 2018

(54) CARRYING DEVICE FOR AN END USER OF A WALKER

(71) Applicant: Randall Donahue, Lisle, IL (US)

(72) Inventor: Randall Donahue, Lisle, IL (US)

(73) Assignee: Randall Donahue, Phoenix, AZ (US)

( * ) Notice: Subject to any disclaimer, the term of this patent is extended or adjusted under 35 U.S.C. 154(b) by 0 days. days.

(21) Appl. No.: 15/018,447

(22) Filed: Feb. 8, 2016

(65) Prior Publication Data

US 2017/0224575 A1    Aug. 10, 2017

(51) Int. Cl.
*B62B 1/16* (2006.01)
*A61H 3/04* (2006.01)
*B62B 5/00* (2006.01)
*A61H 3/00* (2006.01)

(52) U.S. Cl.
CPC ............. *A61H 3/04* (2013.01); *B62B 5/0079* (2013.01); *A61H 2003/002* (2013.01)

(58) Field of Classification Search
CPC .... B62B 1/04; B62B 1/06; B62B 1/12; B62B 1/14; B62B 1/16; B62B 1/20; B62B 1/202; B62B 1/22
USPC .......................................... 280/304.1, 47.18
See application file for complete search history.

(56) References Cited

U.S. PATENT DOCUMENTS

| | | | |
|---|---|---|---|
| 3,165,112 A | | 1/1965 | Ries |
| 4,055,354 A * | | 10/1977 | Sharpe ................... B62B 5/061 280/47.31 |
| 4,383,695 A * | | 5/1983 | Ray ........................... B62B 1/14 248/558 |
| 4,474,202 A | | 10/1984 | Blechner |
| 4,756,541 A * | | 7/1988 | Albitre ................. B62K 27/006 280/204 |
| 4,795,182 A * | | 1/1989 | Dyess ...................... A61G 5/10 188/2 F |
| 5,011,169 A * | | 4/1991 | Henderson ............ B62B 5/0026 280/202 |
| 5,356,059 A * | | 10/1994 | Yanez ...................... A61G 5/10 224/407 |
| 5,465,987 A * | | 11/1995 | DellaVecchia ............ B62B 1/14 280/47.18 |
| 5,794,957 A * | | 8/1998 | Mendon .................... A61G 5/10 280/204 |
| 6,053,515 A * | | 4/2000 | Kelley ...................... B62B 1/12 280/47.18 |
| 6,109,644 A * | | 8/2000 | Cox ......................... B62B 1/20 280/47.24 |
| 6,247,710 B1 * | | 6/2001 | Luberda ................... B62B 1/14 280/47.18 |

(Continued)

*Primary Examiner* — Jeffrey J Restifo
(74) *Attorney, Agent, or Firm* — Marshall, Gerstein & Borun LLP

(57) ABSTRACT

A carrying device is provided to carry at least one article for an end user of a walker while the end user is utilizing the walker. The carrying device includes a base having a first end, a second end, and a carrying surface extending between the first and second ends. The carrying surface is adapted to removably retain the at least one article for the end user. The carrying device further includes a support arm coupled to and extending outwardly from the second end of the base. The support arm is configured to support the at least one article when the at least one article is retained on the carrying surface at a position proximate to the second end of the base.

20 Claims, 8 Drawing Sheets

(56) References Cited

U.S. PATENT DOCUMENTS

| | | | |
|---|---|---|---|
| 6,273,444 B1* | 8/2001 | Power | A61G 5/10 280/204 |
| 6,302,414 B1* | 10/2001 | Berthiaume | B62B 1/002 280/47.18 |
| 6,318,392 B1* | 11/2001 | Chen | A61H 3/04 135/66 |
| 6,651,994 B2* | 11/2003 | Hallgrimsson | A61G 5/08 135/67 |
| 6,685,200 B1* | 2/2004 | Giannoni | B62B 3/02 108/57.16 |
| 6,758,482 B2* | 7/2004 | Stallbaumer | B62B 1/125 280/47.18 |
| 7,036,699 B1* | 5/2006 | Hay | A61G 5/10 224/407 |
| 7,052,030 B2* | 5/2006 | Serhan | A61H 3/04 280/304.1 |
| 7,195,257 B2* | 3/2007 | Stoneback | B62B 3/104 280/280 |
| 7,275,758 B1* | 10/2007 | Diaz | A45C 3/04 280/33.995 |
| 8,061,376 B2 | 11/2011 | Ryan et al. | |
| 8,794,655 B1* | 8/2014 | Gipson | B62B 1/008 280/304.1 |
| 9,022,395 B1* | 5/2015 | Vanderberg | F25D 3/08 280/47.131 |
| 9,033,355 B2* | 5/2015 | Lin | B62K 27/00 280/202 |
| 9,358,997 B2* | 6/2016 | Grace, VII | B65D 25/005 |
| 2003/0218312 A1* | 11/2003 | Forshee | B62B 5/002 280/304.1 |
| 2004/0201186 A1* | 10/2004 | Tornabene | B62B 1/002 280/30 |
| 2007/0222180 A1* | 9/2007 | Amiri | A61G 5/1054 280/304.1 |
| 2008/0309051 A1* | 12/2008 | Elflein | A61G 5/10 280/304.1 |
| 2009/0152827 A1* | 6/2009 | Freitas Silva | B62B 5/002 280/63 |
| 2010/0237215 A1* | 9/2010 | Dahl | A61G 5/12 248/419 |
| 2011/0127736 A1* | 6/2011 | Oliver | B25H 3/00 280/47.17 |
| 2012/0049474 A1* | 3/2012 | Del Rosario | B62B 1/008 280/47.34 |
| 2013/0038036 A1* | 2/2013 | Lester | A61G 5/10 280/304.1 |
| 2013/0106070 A1 | 5/2013 | Woo | |
| 2015/0291194 A1* | 10/2015 | Robinson | B62B 1/26 280/47.18 |
| 2015/0360708 A1* | 12/2015 | Benton | B62B 5/002 221/151 |
| 2016/0176428 A1* | 6/2016 | Busser | B62B 5/00 280/769 |

* cited by examiner

CARRYING DEVICE FOR AN END USER OF A WALKER

FIELD OF THE DISCLOSURE

The present disclosure generally relates to walkers or walking aids, and, more particularly, to a carrying device for use with a walker or walking aid.

BACKGROUND

Walkers or walking aids, which help individuals (e.g., elderly persons, disabled persons) maintain balance or stability while walking, are generally known in the art. Conventional walkers or walking aids are usually constructed of a lightweight tubular material and have a U-shaped frame with handles that provide a place for an end user to grab to maintain balance or stability while walking. However, because the end user must grab one or both of the handles, that end user is unable to carry much, if anything, while utilizing the walker. This is particularly true if the end user is frail and/or has severe balance or stability issues.

Some known walkers or walking aids thus incorporate a small tray or small basket on the U-shaped frame. While this may allow the end user to transport small articles, e.g., a purse, while utilizing the walker, it does not allow the end user to carry larger articles, such as, for example, luggage, shopping bags, coats, and other receptacles or containers for carrying various articles, and/or simultaneously carry numerous different articles while utilizing the walker.

DETAILED DESCRIPTION

The present disclosure is directed to a carrying device for use with a walker or walking aid. The carrying device is configured to carry large articles (e.g., luggage, shopping bags, coats, containers, etc.) and a multitude of different articles. Thus, when the carrying device is coupled to a walker or walking aid, an end user of the walker or walking aid can transport one or more large articles and/or simultaneously transport numerous different articles while at the same time utilizing the walker for walking-assistance.

FIGS. 1-4 depict a first example of a carrying device 100 constructed in accordance with the principles of the present disclosure. The carrying device 100 is, in FIGS. 1-4, being used with one example of a walker or walking aid 104 that, as discussed above, is used to help individuals (e.g., elderly persons, disabled persons) maintain balance or stability while walking. As will be described in greater detail below, the carrying device 100, which is configured to securely retain one or more large articles (e.g., suitcases, shopping bags) and/or simultaneously retain a multitude of different articles, can be coupled (e.g., removably) to the walker or walking aid 104, thereby allowing an end user of the walker 104 to easily carry one or more large articles (e.g., suitcases, shopping bags) and/or simultaneously carry a multitude of articles (e.g., groceries, shopping bags) while utilizing the walker 104.

Figure 1:
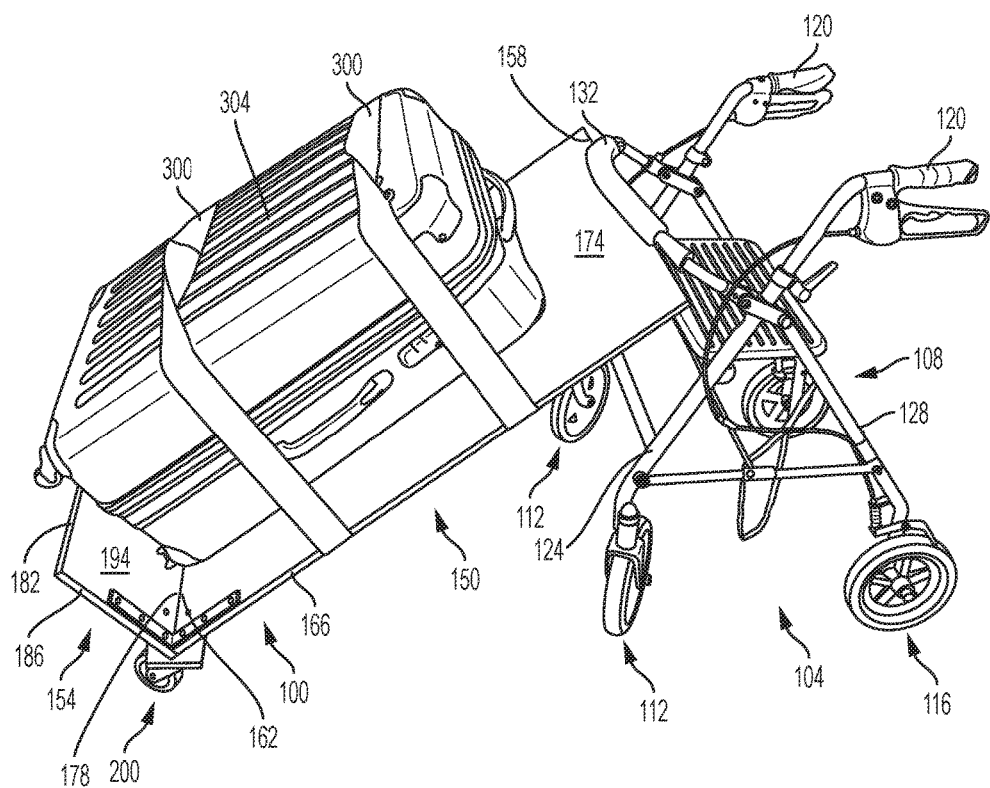
FIG. 1 is a perspective view of a first example of a carrying device constructed in accordance with the teachings of the present disclosure and coupled to one example of a walker.
Figure 2:
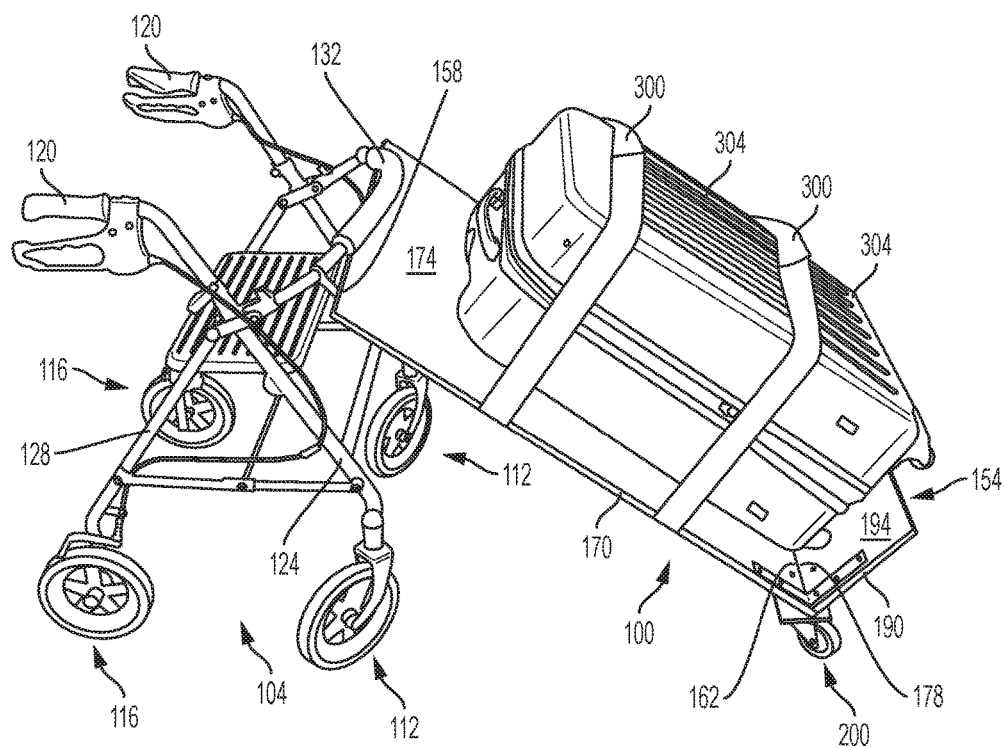
FIG. 2 is another perspective view of the carrying device and the walker illustrated in FIG. 1.
Figure 3:
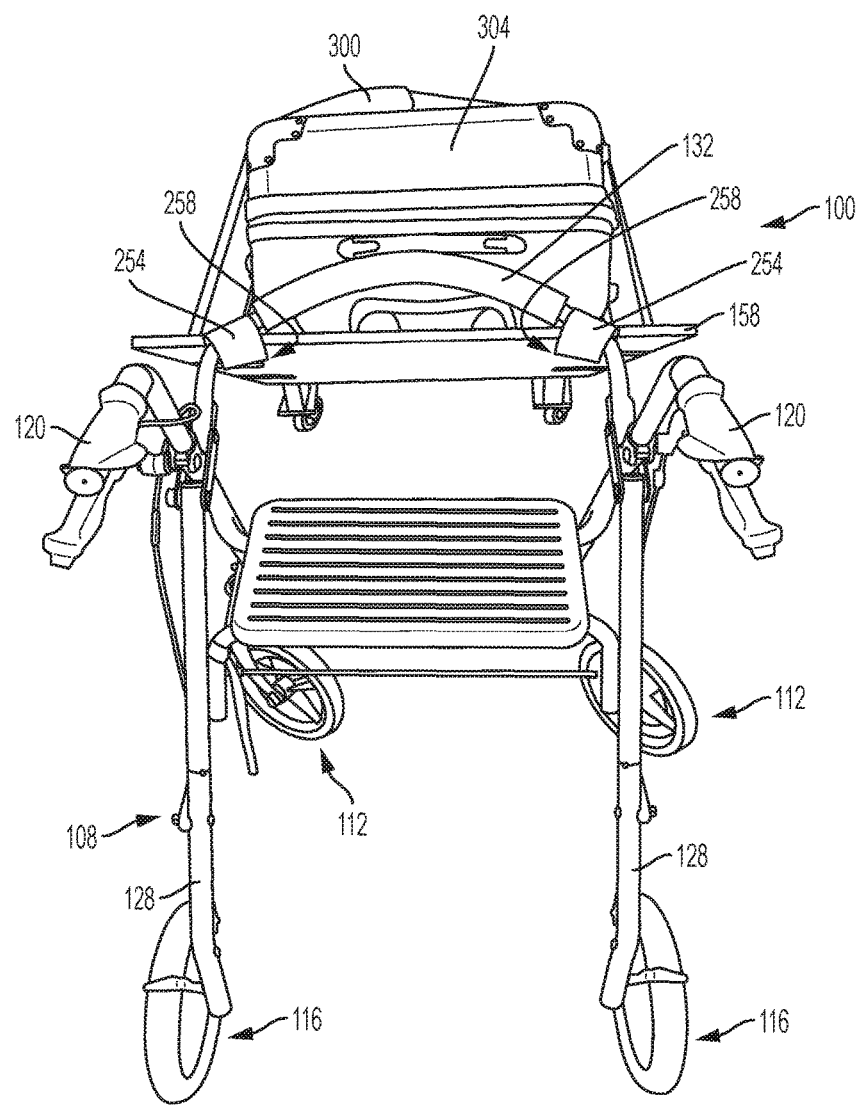
FIG. 3 is a rear, end view of the carrying device and the walker illustrated in FIG. 1.
Figure 4:
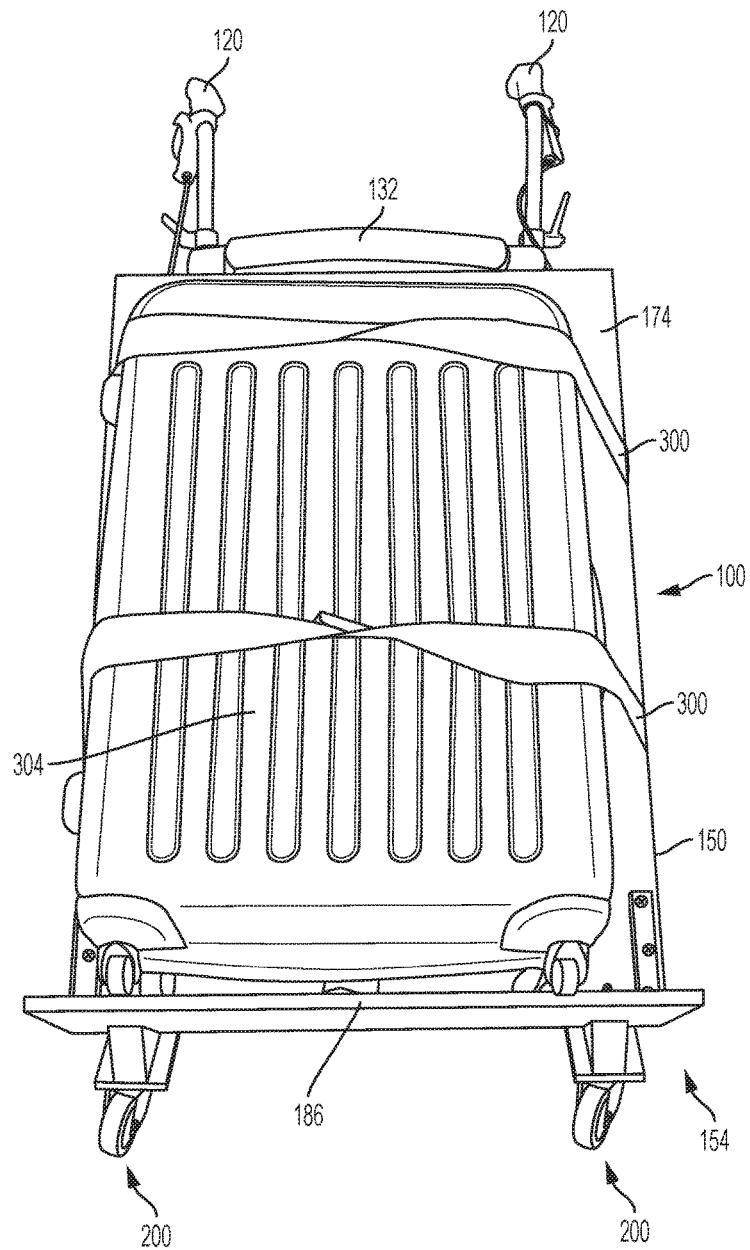
FIG. 4 is an enlarged, top perspective view of the carrying device illustrated in FIG. 1.

The walker 104 depicted in FIGS. 1-4 generally includes a frame 108, two pairs of wheels—a first pair of wheels 112 and a second pair of wheels 116—and a pair of handles 120. The frame 108 is a foldable frame that includes a pair of front legs 124 and a pair of rear legs 128 pivotably coupled to the pair of front legs 124 in a known manner. Such a construction allows the frame 108 to be folded into a compact profile when the walker 104 is not in use. The first pair of wheels 112 are coupled to and extend downwardly from a respective one of the front legs 124, while the second pair of wheels 116 are coupled to and extend downwardly from a respective one of the rear legs 128. The frame 108 also includes a substantially U-shaped cross bar 132 that extends outwardly (e.g., in a forward direction) from a portion of the frame 108. As best illustrated in FIG. 3, the cross bar 132 transversely extends between opposite sides of the frame 108. The pair of handles 120 are coupled to and extend rearwardly from a portion of the frame 108. In turn, an end user of the walker 104 (e.g., an elderly individual) can grab onto one or both of the handles 112 to utilize the walker 104 to provide walking assistance, with the wheels 112, 116 permitting movement of the walker 104, as is known in the art.

The carrying device 100 depicted in FIGS. 1-4 takes the form of a cart generally defined by a base 150 and a support arm 154. The base 150 has a substantially rectangular shape defined by a first end 158, a second end 162, and first and second sides 166, 170. The base 150 includes a carrying surface 174 extending between and defined by the first and second ends 158, 162, and the first and second sides 166, 170. The carrying surface 174 in this example is a solid surface, e.g., it does not include openings, though that need not be the case, as will be described in greater detail below. The arm 154, which in this example extends outwardly from the second end 162 of the base 150, has a substantially rectangular shape defined by a first end 178, a second end 182, and first and second sides 186, 190. The arm 154 also includes a support surface 194 extending between and defined by the ends 178, 182 and the sides 186, 190. The support surface 194 is smaller than the carrying surface 174, but like the carrying surface 174, is a solid surface in this example, e.g., it does not include openings, though that need not be the case. In any event, it will be appreciated that the support arm 154, and particularly the support surface 194, is configured to support one or more articles positioned on the carrying surface 174, particularly articles positioned proximate to the second end 182 of the base 150.

In some cases, e.g., the example illustrated in FIGS. 1-4, the arm 154 is coupled to the base 150 via one or more brackets, with the arm 154, and more particularly the support surface 194, oriented substantially, if not exactly, perpendicular to the base 150, and more particularly the carrying surface 174. In other cases, the base 150 and the arm 154 can be integrally formed with one another. Alternatively or additionally, the arm 154, and more particularly the support surface 194, can be oriented at a different angle relative to the base 150. As an example, the support surface 194 can be oriented at an angle of 45 degrees, 60 degrees, or 120 degrees relative to the base 150.

The carrying device 100 depicted in FIGS. 1-4 also includes a pair of caster wheels 200 that facilitate movement of the device. The wheels 200 are disposed on an underside 202 of the carrying device 100 proximate to a front of the carrying device 100. More particularly, the wheels are disposed on the underside 202 of the carrying device 100 proximate to an interface between the base 150 and the arm 154, i.e., proximate to the second end 162 of the base 150 and the first end 178 of the arm 154. When the carrying device 100 is coupled to the walker 104, each of the caster wheels 200 is substantially aligned with a respective one of the front wheels 112 and a respective one of the rear wheels 116, as illustrated in FIG. 3. This helps to ensure that the walker 104 and the carrying device 100, when coupled to the walker 104, move together in a smooth manner (i.e., the carrying device 100 does not inhibit the movement of the walker 104, and thus the end user of the walker 104).

As noted above, the carrying device 100 can be coupled to the walker 104 so as to allow an end user of the walker 104 to carry one or more large articles and/or simultaneously carry a multitude of articles while utilizing the walker 104. The carrying device 100 can be coupled to the walker 104 in any number of different manners.

In the example illustrated in FIGS. 1-4, the carrying device 100 is removably coupled to the walker 104 via a pair of fastening devices 250. Each of the fastening devices 250 generally includes a male fastening component 254 and a female fastening component 258 configured to securely engage one another, with the male fastening component 254 disposed on one of the carrying device 100 and the walker 104, and the female fastening component 258 disposed on the other of the carrying device 100 and the walker 104. At least in the illustrated example, each of the fastening devices 250 takes the form of a hook-and-loop (e.g., Velcro®) fastening device, with the male fastening component 254 taking the form of a hook fastening component coupled to and extending outwardly from the transverse cross bar 132, and the female fastening component 258 taking the form of a loop fastening component arranged on the underside 202 of the base 150 of the carrying device. Thus, when it is desired to utilize the carrying device 100 in connection with the walker 104, the carrying device 100 can be coupled to the walker 104 by positioning the first end 158 of the base 150 proximate to the transverse cross bar 132 of the walker 104 and pressing the male and female fastening components 254, 258 together. Conversely, when the carrying device 100 is no longer needed, the carrying device 100 can be decoupled from the walker 104 by pulling or peeling the male and female components 254, 258 apart from one another.

In other examples, the carrying device 100 can be removably coupled to the walker 104 in a different manner. To this end, the male and female fastening components 254, 258 can, for example, take the form of snaps or buttons, tabs and slots, adhesive, magnets, or other fastening components. The male and female fastening components 254, 258 can also be positioned differently than the male and female fastening components 254, 258 illustrated in FIGS. 1-4. As an example, the male fastening components 254 can be arranged on the base 150 (e.g., on the underside 202) of the carrying device 100, and the female fastening components 258 can be arranged on some portion of the walker 104 (e.g., on the transverse cross bar 132, on the front legs 124). In yet other examples, the carrying device 100 can be fixedly coupled to the walker 104. To this end, the carrying device 100 can be welded, threaded, pinned, or otherwise fixedly coupled to the walker 104, such that the carrying device 100 is always used in connection with the walker 104.

In any event, when the carrying device 100 is coupled to the walker 104, the carrying device 100, and more particularly the carrying surface 174, is configured to receive and securely retain one or more articles so as to allow the end user of the walker 104 to carry or transport such articles while at the same time utilizing the walker 104. The carrying device 100 illustrated in FIGS. 1-4 includes one or more straps 300, e.g., Velcro® straps, that are fixed to the underside 202 of the base 150 but can be adjusted to accommodate and securely retain different sized articles. In FIGS. 1-4, the carrying device 100 is, via the straps 300, securely retaining an article in the form of a suitcase 304 positioned on the carrying surface 174 and supported by the support arm 154, particularly the support surface 194. Though not explicitly illustrated, these same straps 300 can be used to securely retain other containers or receptacles (e.g., bags, baskets, etc.), which may in turn be filled with one or more articles (e.g., groceries), and/or can be used to directly retain the articles themselves. In some cases, the carrying device 100 can, instead of or in addition to the straps 300, include one or more containers or receptacles specifically configured to mate with one or more portions of the carrying device 100 (e.g., the carrying surface 174). In these cases, the one or more containers or receptacles can be integrally formed with the carrying device 100 or can be removable from the carrying device 100 (e.g., when not needed).

Of course, when the end user has reached his/her destination, the end user (and/or one or more other individuals) can remove one or more of the articles from the carrying device 100 by releasing the straps 300 (or by removing the articles from the container or receptacle or removing the container or receptacle itself, when the device 100 utilizes such a container). At the same time, the carrying device 100 can, but need not, be decoupled from the walker 104, e.g., to store the carrying device 100.

Figure 5:
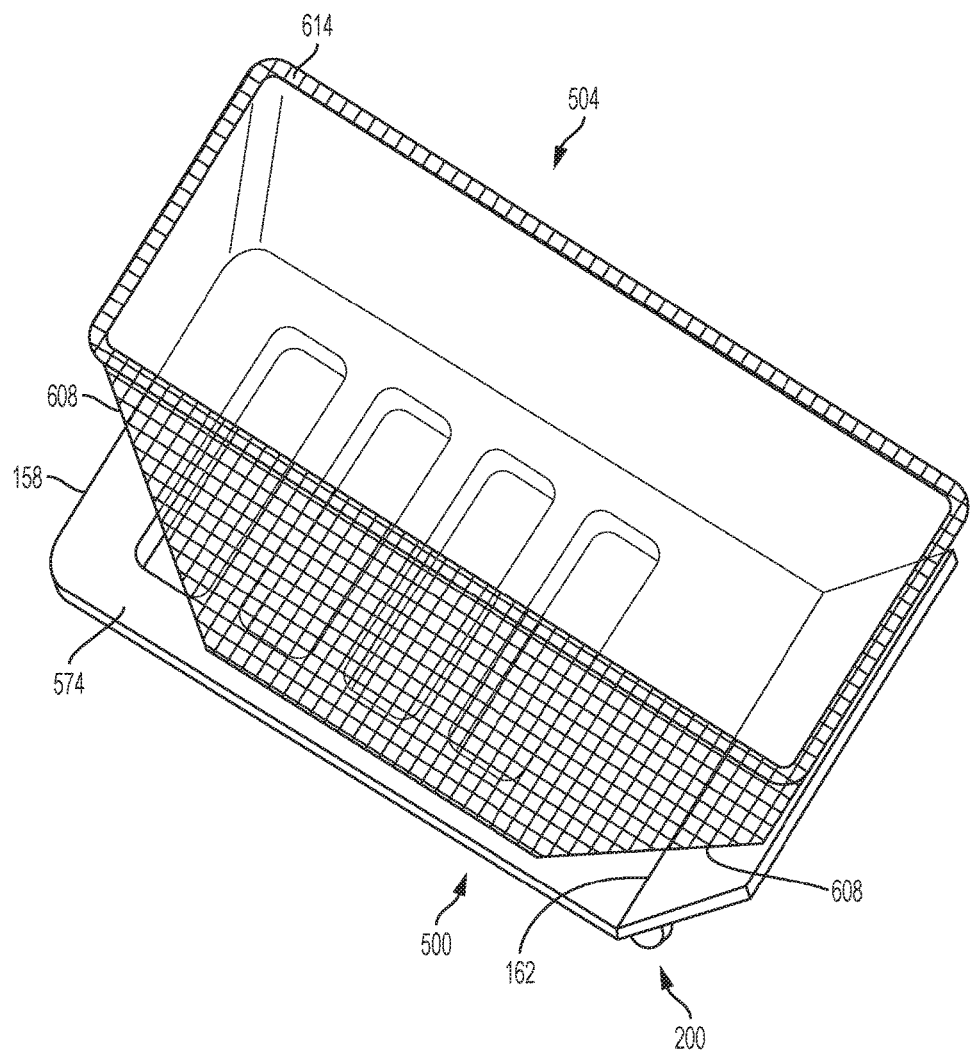
FIG. 5 a perspective view of a second example of a carrying device constructed in accordance with the teachings of the present disclosure, the carrying device including a container removably coupled to a carrying surface of the device for carrying at least one article.

FIGS. 5-9 illustrate a second example of a carrying device 500 constructed in accordance with the principles of the present disclosure, as well as a container or receptacle 504 specifically configured to be removably coupled to the carrying device (as is illustrated in FIG. 5) so as to enable an end user of a walker (e.g., the walker 104) to carry or transport one or more articles while utilizing the walker.

Figure 6:
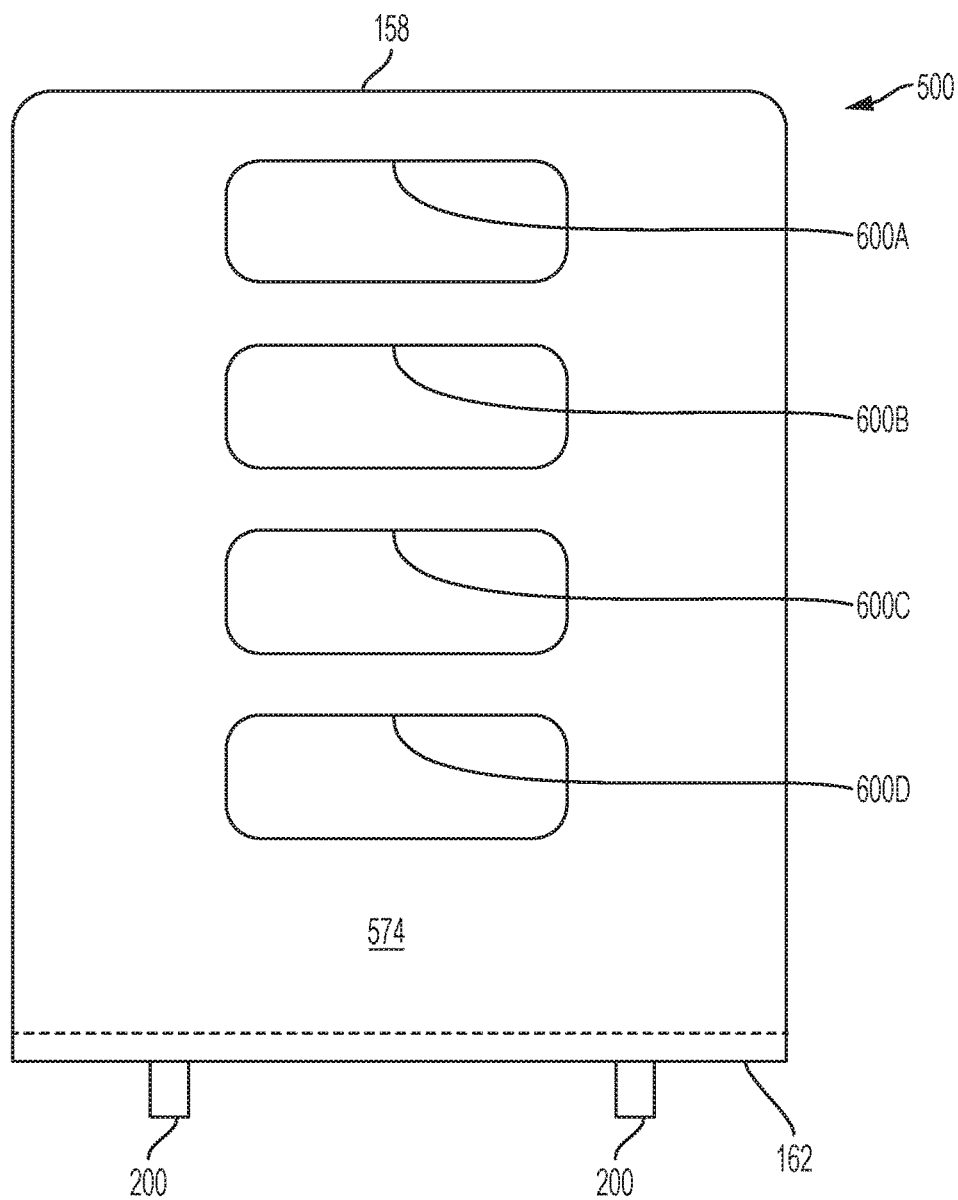
FIG. 6 is a top view of the carrying device of FIG. 5, with the container removed from the carrying surface.

As best illustrated in FIGS. 5 and 6, the carrying device 500 is similar to the carrying device 100, with similar components illustrated using similar reference numerals, but takes on a slightly different form. More particularly, the carrying device 500 includes a carrying surface 574 that, unlike the carrying surface 174, includes a plurality of openings 600 sized to receive one or more portions of the container 504, as will be described in greater detail below. In this example, the carrying surface 574 includes four substantially rectangular openings 600A-600D that are spaced apart at an approximately equal distance from one another, with the opening 600A spaced closer to the first end 158 of the carrying device 500 than the opening 600D is spaced from the second end 162 of the carrying device (i.e., the openings 600A-600D are off center relative to the first and second ends 158, 162). In other examples, the carrying surface 574 can include more or less openings 600, differently sized and/or shaped openings 600, and/or the openings 600 can be positioned differently relative to the first and second ends 158, 162 or one another.

Figure 7:
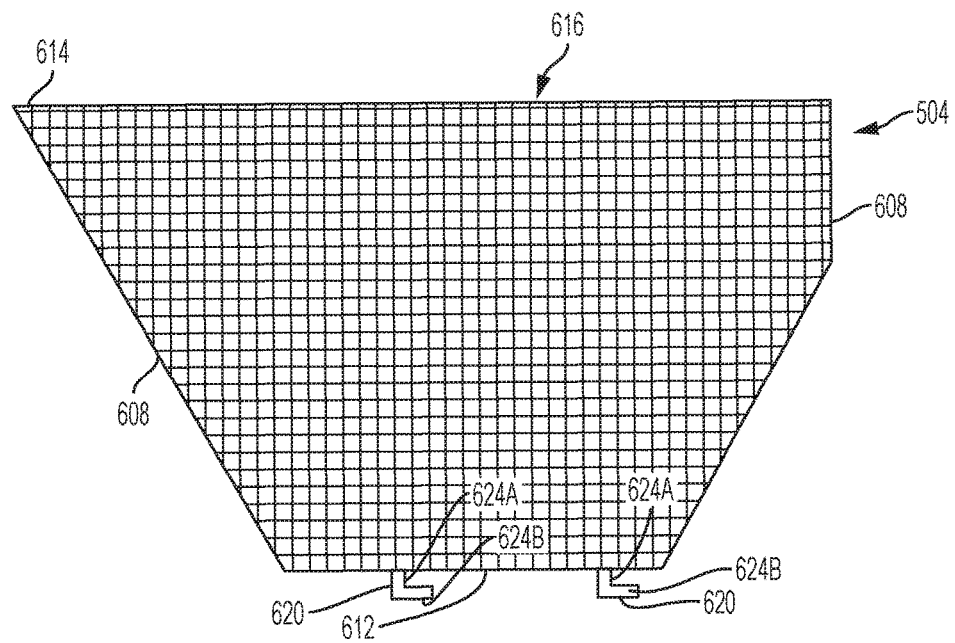
FIG. 7 is a side view of the container of the carrying device of FIG. 5.
Figure 8:
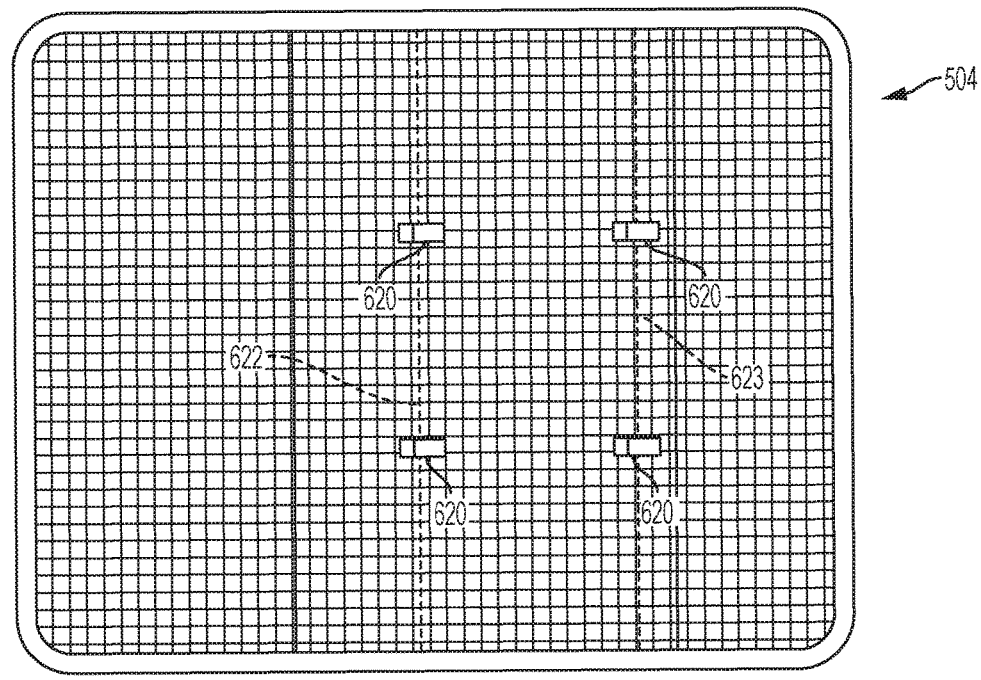
FIG. 8 is a bottom view of the container of FIG. 7.

As best illustrated in FIGS. 7 and 8, the container 504 in this example takes the form of a wire form basket having a plurality of sidewalls 608 and a bottom wall 612. The sidewalls 608 extend upwardly and outwardly from the bottom wall 612, and, at least in this example, do so at an approximately 30 degree angle (though other angles, including 90 degrees, are possible). Each of the sidewalls 608 terminates at an end that forms or defines a rim 614 of the container 504. The container 504 has an open top, defined by the rim 614, that allows an end user of the container 504 to access an interior opening 616 defined by the sidewalls 608 and the bottom wall 612. The interior opening 616 is sized to receive any number of different articles (e.g., groceries, clothes, etc.). The container 504 also includes a plurality of securing elements 620 configured to facilitate a removable connection between the container 504 and the carrying device 500 via the openings 600. In this example, the container 504 has four securing elements 620 in the form of hooks that are coupled to and extend outwardly from the bottom wall 612. The securing elements 620 in this example are spaced about the bottom wall 612 in the manner illustrated in FIG. 8 so as to be in alignment with two adjacent openings 600. In particular, two of the securing elements 620 are aligned with one another in or along a first transverse axis 622, while the remaining two securing elements 620 are aligned with one another in or along a second transverse axis 623 that is parallel to the first transverse axis 622. Each securing element 620 has a first portion 624A that extends downwardly from the bottom wall 612 (at least in the orientation illustrated in FIG. 7) and a second portion 624B that extends outwardly from (and is substantially perpendicular, at least in this case, to) the first portion 624A. In other examples, the securing elements 620 can take the form of snaps or buttons, tabs, adhesive, magnets, or other fastening components, and/or the securing elements 620 can be arranged differently (e.g., when the openings 600 are arranged in a different manner).

Figure 9:
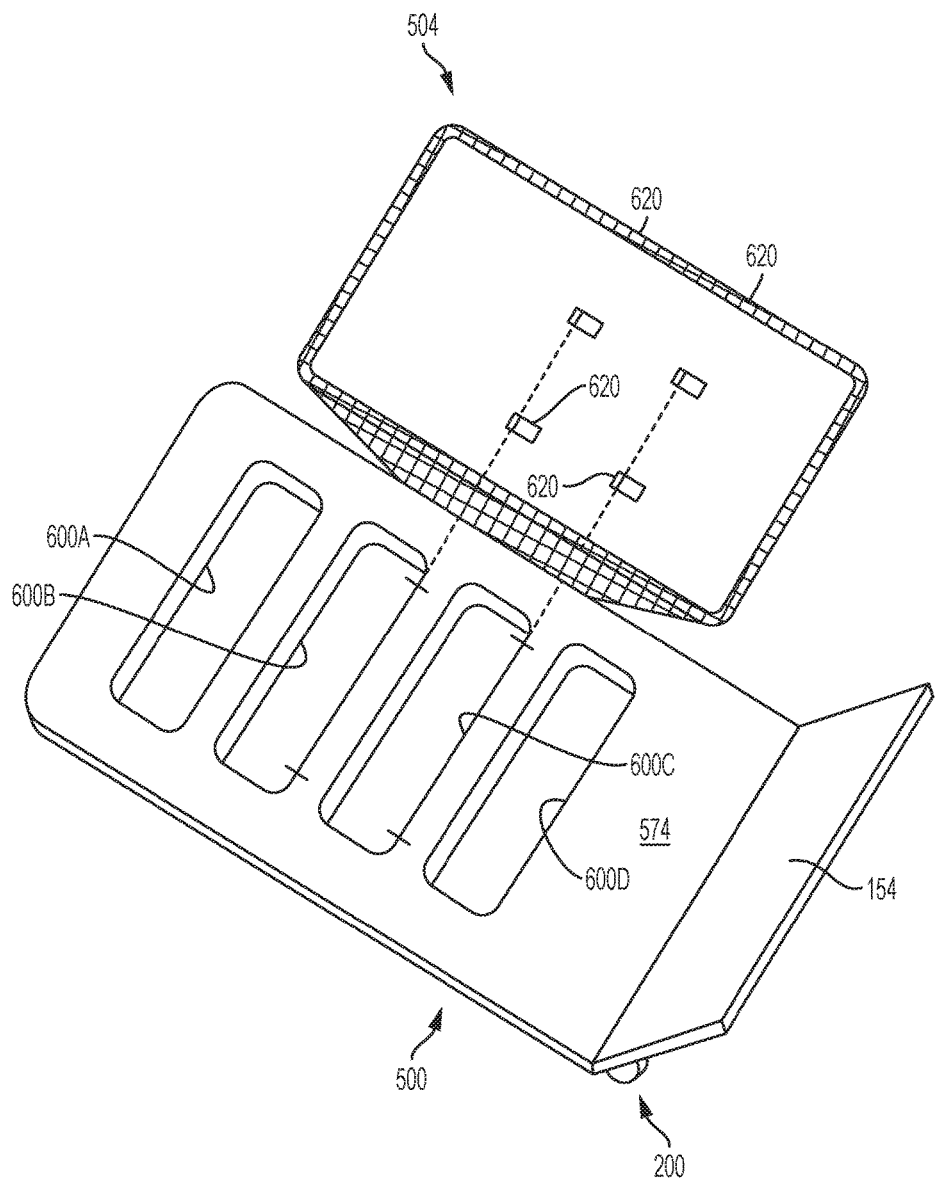
FIG. 9 is a perspective view of the carrying device of FIG. 5, showing the container of FIG. 7 being coupled to the carrying surface.

When the end user desires to utilize the container 504 for carrying or transporting articles, the container 504 can be coupled to the carrying surface 574 by disposing or inserting the securing elements 620 of the container 504 into two adjacent openings 600 of the carrying device 500, as illustrated in FIG. 9. More specifically, the two securing elements 620 aligned along the first transverse axis 622 are inserted into a first opening 600 until the first portion 624A of each of these two elements 620 is disposed under the carrying surface 574 (and along an underside 202 of the carrying device 500) and the second portion 624B of each of these two elements is seated against, and engages, a portion of the carrying device 500 that partially defines the first opening 600, while, at the same time, the two securing elements 620 aligned along the second transverse axis 622 are inserted into a second opening 600, adjacent the first opening 600, until the first portion 624A of each of these two elements 620 is disposed under the carrying surface 574 (and along an underside of the carrying device 500) and the second portion 624B of each of these two elements is seated against, and engages, a portion of the carrying device 500 that partially defines the second opening 600. When the securing elements 620 of the container are disposed in this manner, the container 504 is securely coupled to the carrying surface 574, as is illustrated in FIG. 5.

The container 504 can be coupled to the carrying surface 574 before the carrying device 500 is coupled to the walker 104 or after the carrying device 500 has been coupled to the walker 104. In either case, once the carrying device 500 is coupled to the walker 104 and the container 504 is coupled to the carrying surface 574, the end user of the walker 104 can carry or transport one or more articles, via the container 504, while at the same time utilizing the walker 104 for walking assistance. When the end user has reached his/her destination, the end user (and/or one or more other individuals) can remove one or more of the articles from the container 504 or can remove the container 504 from the carrying surface 574 by removing the securing elements 620 from the openings 600. At the same time, the carrying device 100 can, but need not, be decoupled from the walker 104, e.g., to store the carrying device 100.

It will be appreciated that the carrying devices described herein can be made of metal, plastic (e.g., rubber), wood, one or more other materials, or combinations thereof. Finally, while the carrying device 100 is illustrated as being used in connection with the walker 104, it will be appreciated that the carrying device 100 can be utilized in connection with a different walker or walking aid.

It will also be appreciated that the carrying device can vary from the carrying devices 100, 500 described herein and yet still function as intended. More specifically, the components of the carrying devices 100, 500, e.g., the bases, the support arms, the wheels, can vary in shape, size, and/or arrangement relative to one another. As an example, the base 150 can have a circular, triangular, irregular, or other shape. Finally, it will be appreciated that while the carrying device 100 is illustrated as being used in connection with the walker 104, the carrying device 100, as well as the carrying device 500, can be used with any other type of walker or walking aid.

Preferred embodiments of this invention are described herein, including the best mode or modes known to the inventors for carrying out the invention. Although numerous examples are shown and described herein, those of skill in the art will readily understand that details of the various embodiments need not be mutually exclusive. Instead, those of skill in the art upon reading the teachings herein should be able to combine one or more features of one embodiment with one or more features of the remaining embodiments. Further, it also should be understood that the illustrated embodiments are exemplary only, and should not be taken as limiting the scope of the invention. All methods described herein can be performed in any suitable order unless otherwise indicated herein or otherwise clearly contradicted by context. The use of any and all examples, or exemplary language (e.g., "such as") provided herein, is intended merely to better illuminate the aspects of the exemplary embodiment or embodiments of the invention, and do not pose a limitation on the scope of the invention. No language in the specification should be construed as indicating any non-claimed element as essential to the practice of the invention.

The invention claimed is:
1. A walking-assistance device, comprising:
   a walker, comprising:
      a frame having a pair of front legs, a pair of rear legs, one or more handle assemblies extending outwardly from the rear legs, and a cross bar extending outwardly from and transversely between the front legs;

a carrying device removably coupled to the cross bar of the frame for carrying at least one article for an end user of the walker while the end user is utilizing the walker, the carrying device comprising:
  a base having a first end, a second end, and a carrying surface extending between the first and second ends, the carrying device configured to be removably coupled to the cross bar of the frame via the first end of the base, and the carrying surface adapted to removably retain the at least one article;
a pair of fastening strips coupled to one of the base of the carrying device and the cross bar of the frame, the fastening strips configured to releasably engage the other of the base of the carrying device and the cross bar of the frame to removably couple the carrying device to the cross bar,
wherein the cross bar is angled upwards from the front legs such that the carrying device is disposed underneath the cross bar.

2. The walking-assistance device of claim 1, wherein the walker comprises a pair of front wheels coupled to the pair of front legs and a pair of rear wheels coupled to the pair of rear legs, and wherein the carrying device comprises at least one wheel disposed proximate to the second end of the base.

3. The walking-assistance device of claim 2, wherein the carrying device comprises a pair of wheels disposed proximate to the second end of the base, one of the pair of wheels of the carrying device being aligned with one of the pair of front wheels and one of the pair of rear wheels of the walker, and the other of the pair of wheels of the carrying device being aligned with the other of the pair of front wheels and the other of the pair of rear wheels of the walker.

4. The walking-assistance device of claim 1, wherein the carrying device further comprises a support arm coupled to and extending outwardly from the second end of the base, the support arm configured to support the at least one article when retained on the carrying surface at a position proximate to the second end of the base.

5. The walking-assistance device of claim 1, further comprising a receptacle removably coupled to the carrying surface, the receptacle adapted to removably retain the at least one article.

6. The walking-assistance device of claim 5, wherein the carrying surface comprises one or more openings, and wherein the receptacle comprises one or more outwardly extending hooks configured to be disposed in the one or more openings, respectively, to couple the receptacle to the carrying surface.

7. The walking-assistance device of claim 6, wherein the receptacle comprises a wire form having a bottom wall and a plurality of sidewalls extending outwardly and upwardly from the bottom wall, the one or more hooks extending outwardly from the bottom wall.

8. The walking-assistance device of claim 5, wherein the carrying device comprises one or more adjustable straps configured to removably couple the receptacle to the carrying surface.

9. The walking-assistance device of claim 1, further comprising a pair of first fasteners arranged to removably couple the carrying device to the walker, each of the pair of first fasteners comprising one of the fastening strips coupled to a portion of the cross bar and a mating fastening component disposed on the carrying device proximate to the second end of the base, the fastening strips configured to engage the mating fastening components.

10. The walking-assistance device of claim 1, wherein when the carrying device is removably coupled to the cross bar of the frame, the first end of the base is positioned immediately proximate the cross bar of the frame.

11. The walking-assistance device of claim 1, wherein the carrying surface comprises one or more openings, the carrying device further comprising:
  a receptacle coupled to the carrying surface, the receptacle adapted to removably retain the at least one article for the end user, wherein the receptacle comprises one or more hooks configured to be disposed in the one or more openings, respectively, to couple the receptacle to the carrying surface; and
  a support arm coupled to and extending outwardly from the second end of the base, the support arm configured to support the receptacle when the receptacle is coupled to the carrying surface at a position proximate to the second end of the base.

12. The walking-assistance device of claim 11, wherein the support arm is substantially perpendicular to the carrying surface.

13. The walking-assistance device of claim 11, wherein the receptacle comprises a wire form.

14. The walking-assistance device of claim 11, wherein the one or more hooks extend outwardly from a bottom wall of the receptacle.

15. The walking-assistance device of claim 11, wherein the base comprises one or more first fastening components arranged proximate to the first end, the base adapted to be coupled to the walker via the one or more first fastening components.

16. The walking-assistance device of claim 11, further comprising one or more adjustable straps adapted to removably retain the at least one article.

17. The walking-assistance device of claim 11, further comprising one or more wheels positioned proximate to an interface between the base and the arm.

18. The walking-assistance device of claim 1, wherein the carrying surface includes a plurality of openings, the carrying device further comprising at least one receptacle removably coupled to the carrying surface of the base and adapted to carry the at least one article for the end user, the at least one receptacle comprising one or more hooks arranged to be disposed in the one or more openings, respectively, to couple the at least one receptacle to the carrying surface.

19. The walking-assistance device of claim 18, wherein the at least one receptacle comprises a wire form.

20. The walking-assistance device of claim 1, wherein when the one or more hooks are disposed in the one or more openings, the one or more hooks are partially disposed underneath the carrying surface.

* * * * *

UNITED STATES PATENT AND TRADEMARK OFFICE
CERTIFICATE OF CORRECTION

PATENT NO. : 9,980,874 B2  
APPLICATION NO. : 15/018447  
DATED : May 29, 2018  
INVENTOR(S) : Randall Donahue It is certified that error appears in the above-identified patent and that said Letters Patent is hereby corrected as shown below:

On the Title Page

Item (*), in Column 1, under "Notice", Line 3, "0 days. days." should be -- 0 days. --.

In the Claims

At Column 8, Line 45, "claim 1," should be -- claim 11, --.

At Column 8, Line 56, "claim 1," should be -- claim 11, --.

Signed and Sealed this  
Twenty-first Day of April, 2020

Andrei Iancu  
*Director of the United States Patent and Trademark Office*